(12) United States Patent
Groemmer et al.

(10) Patent No.: US 6,581,678 B1
(45) Date of Patent: Jun. 24, 2003

(54) HEATING OR AIR-CONDITIONING SYSTEM FOR A MOTOR VEHICLE

(75) Inventors: Christian Groemmer, Stetten (DE); Norbert Woecht, Schwaebisch-Gmeund (DE)

(73) Assignee: Behr GmbH & Co., Stuttgart (DE)

( * ) Notice: Subject to any disclaimer, the term of this patent is extended or adjusted under 35 U.S.C. 154(b) by 155 days.

(21) Appl. No.: 09/716,380

(22) Filed: Nov. 21, 2000

Related U.S. Application Data

(63) Continuation of application No. 09/150,616, filed on Sep. 10, 1998, now abandoned.

(30) Foreign Application Priority Data

Sep. 10, 1997 (DE) .......................................... 197 39 578

(51) Int. Cl.[7] .......................... F25B 29/00; B60H 1/00; B60H 3/00
(52) U.S. Cl. .......................... 165/42; 165/43; 165/203; 165/202; 454/156; 454/160; 237/12.3 A; 237/12.3 B; 219/202; 219/208
(58) Field of Search ............................ 165/42, 43, 203, 165/202; 219/202, 208, 209; 454/156, 160; 237/12.3 A, 12.3 B

(56) References Cited

U.S. PATENT DOCUMENTS

| 4,289,195 A | 9/1981 | Bellot et al. ................. 165/42 |
| 4,390,124 A | 6/1983 | Nilsson ................. 237/12.3 A |
| 4,842,047 A | 6/1989 | Sakurada et al. .............. 165/43 |
| 4,852,638 A | 8/1989 | Hildebrand et al. .... 237/12.3 A |
| 5,016,704 A | 5/1991 | Ono ................................ 165/1 |
| 5,101,883 A | 4/1992 | Kinmartin et al. .......... 454/160 |
| 5,186,237 A | 2/1993 | Adasek et al. ............... 165/203 |
| 5,199,485 A | 4/1993 | Ito et al. ...................... 165/203 |
| 5,505,251 A | 4/1996 | Sarbach ........................ 165/42 |
| 5,862,677 A | 1/1999 | Kim et al. ..................... 165/42 |
| 5,950,711 A * | 9/1999 | Bendell ......................... 165/42 |
| 6,189,801 B1 * | 2/2001 | Klingler et al. ........ 237/12.3 B |

FOREIGN PATENT DOCUMENTS

| DE | 25 30 133 | 1/1977 |
| DE | 39 40 361 | 6/1991 |
| DE | 41 19 474 | 12/1992 |
| DE | 44 22 120 | 1/1996 |
| EP | 0 419 707 | 4/1991 |
| FR | 2 717 747 | 9/1995 |
| GB | 1 445 234 | 8/1976 |
| JP | 57-95212 | 6/1982 |
| JP | 57-130815 | 8/1982 |
| JP | 61-081216 | 4/1986 |
| JP | 61-150815 | 7/1986 |
| JP | 61-178214 | 8/1986 |
| JP | 5-58144 | 3/1993 |

* cited by examiner

*Primary Examiner*—John K. Ford
(74) *Attorney, Agent, or Firm*—Foley & Lardner

(57) ABSTRACT

The invention relates to a heating or air-conditioning system for a motor vehicle, having a heater for generating warm air, at least one cold air duct leading past the heater, and air mixing spaces provided adjacent to the heater. The air duct is divided into sub-ducts for guiding air into the mixing spaces. The mixing spaces are arranged in the direction of flow and are separated from one another by at least one dividing wall. Cold air and warm air are mixed to a specific temperature in the mixing spaces by means of airflow control elements and then fed to an assigned air-conditioned zone via an air duct and air outlet nozzle.

17 Claims, 3 Drawing Sheets

HEATING OR AIR-CONDITIONING SYSTEM FOR A MOTOR VEHICLE

This application is a continuation of application Ser. No. 09/150,616, filed Sep. 10, 1998 now abandoned.

FIELD OF THE INVENTION

The present invention relates to a heating or air-conditioning system for a motor vehicle that supplies separately air-conditioned air to each individual air-conditioned zone in the interior of the vehicle. In particular, the present invention relates to a heating or air-conditioning system having a heater, a cold air duct, and mixing spaces for mixing air to a specific temperature for each air-conditioned zone.

DESCRIPTION OF THE RELATED ART

French Patent No. 2717747 discloses an air-conditioning system with various air-conditioned zones: "front right" (front passenger's seat), "front left" (driver's seat), "rear left" and "rear right". The air temperature fed to each of the various air-conditioned zones can be set separately. In order to effect the separate controls, the air-conditioning system includes two air-conditioning units, one supplying the left-hand half of the vehicle and one supplying the right-hand half of the vehicle. The air-conditioning units can be used to supply the front area and the rear area with air which has been air-conditioned in different ways. This air-conditioning system is very costly since it requires two air-conditioning units, with each unit including a blower, an evaporator, a heater, and the corresponding air ducts. In addition, it can only be used in large-sized vehicles because of the large amount of space required. Therefore, the system has disadvantages in terms of expense and space required.

German Patent No. 39 40 361 discloses an air-conditioning system which can supply air to four air-conditioned zones. In this air-conditioning system, warm air and cold air are generated and fed to each air-conditioned zone via separate ducts. A mixing space is provided in the region of the air outlet openings for each respective air-conditioned zone. Warm air and cold air are mixed directly in the mixing space before emerging through the air outlet opening into the interior of the vehicle. Although the four air-conditioned zones can be supplied using an air-conditioning system having only one blower, one evaporator and one heater, this patent requires considerable installation space since two air ducts per mixing space supply air to each air-conditioned zone. In addition, this air-conditioning system generally does not adequately mix the warm and cold air because the warm air and cold air are not mixed until directly before emerging out of the air outlet nozzles. Therefore, it is frequently the case that insufficient mixing occurs so that hot and cold air masses emerge from an air outlet nozzles next to one another.

U.S. Pat. No. 5,016,704 discloses an air-conditioning system for motor vehicles including only two independently controlled air-conditioned zones—the front area and the rear area. In the disclosed system, the air-conditioning system is bifurcated downstream of the evaporator. In each of the two parts, the quantity of air which is heated by the heater or fed past the heater is regulated by an air flap. The warm air and cold air can be mixed down-stream of the heater and, after mixing, are fed to the individual outlet nozzles. One disadvantage of this air-conditioning system is that it requires a large installation space. In addition, this system does not ensure sufficient mixing of the air. A further disadvantage of this system is that only two zones can be air-conditioned.

German Patent No. 44 22 120 discloses an air-conditioning system which has a left/right regulator. In order to obtain a compact design, the cold air is fed past the side of the heat exchanger and mixed with the warm air downstream of the heat exchanger. Despite the relatively compact design, the installation space required by this air-conditioning system is still comparatively large because of the space required by the warm air swivel flaps. These swivel flaps execute a swiveling movement into the mixing space and are located downstream of the heat exchanger. A further disadvantage of this system is that it does not ensure optimal mixing of the cold and warm air; since, even in its opened state, the warm-air swivel flap brings about a certain degree of separation of the cold and warm air masses. That is, because the air is fed past the heater laterally, the air which is diverted into the lateral channels is usually poorly mixed. For this reason, the system does not reliably ensure the desired air-conditioning of the diverted air. Moreover, this air-conditioning system is not suitable for supplying more than two air-conditioned zones.

SUMMARY OF THE INVENTION

An object of this invention is to provide an improved heating or air-conditioning system having a simple design, requiring a small installation space and including the ability to supply air which has been air-conditioned in different ways to a plurality of air-conditioned zones. Another object of the invention is to provide optimal mixing of cold and warm air in the heating or air-conditioning system, even despite the small installation space required, so that a set air temperature is provided in each air duct. In this way, the air emerging from air outlet openings in a respective air-conditioned zone is of uniform character, i.e., the emerging air has a constant temperature over the entire outlet cross section of the air outlet opening.

These objects are achieved according to the present invention by means of a heating or air-conditioning system including a heater positioned within a housing for warming air and guiding the warmed air into a mixing space. A cold air duct, including a sub-duct for guiding air into the mixing space, is disposed beneath the heater. A mixing flap is disposed upstream of the heater and the sub-duct. The position of the mixing flap controls the ratio of air entering the heater and the sub-duct so that air from the heater and air from the sub-duct mix to a pre-selected temperature in the mixing space. The mixing space is adapted to communicate with an air duct and an air outlet nozzle to guide air into an air-conditioned zone.

These objects are also achieved according to the present invention by means of a heating or air-conditioning system for a motor vehicle including a heater located in a housing. One cold duct, which comprises a plurality of separate pneumatically parallel sub-ducts, leads under the heater. A plurality of air mixing spaces, disposed adjacent the heater and extending essentially the full height of the heater, are separated by dividing walls and receive warm air from the heater and cool air from the plurality of sub-ducts. Air control elements comprising mixing flaps mix respective quantities of the warm air and cool air to a pre-selected temperature. Each movable mixing flap is disposed upstream of the heater such that in a first position the mixing flap closes off one of the plurality of sub-ducts and in a second position the mixing flap closes off a portion of the inlet of the heater. Each air mixing space communicates with at least one air duct and at least one air outlet nozzle to guide mixed air to a respective air-conditioned zone.

Further objects, features and advantages of the present invention will become apparent from the detailed description of preferred embodiments that follows, when considered together with the attached figures of drawing.

BRIEF DESCRIPTION OF THE DRAWINGS

An exemplary embodiment is depicted in the drawings, in which.

DETAILED DESCRIPTION OF THE PREFERRED EMBODIMENTS

Figure 1:
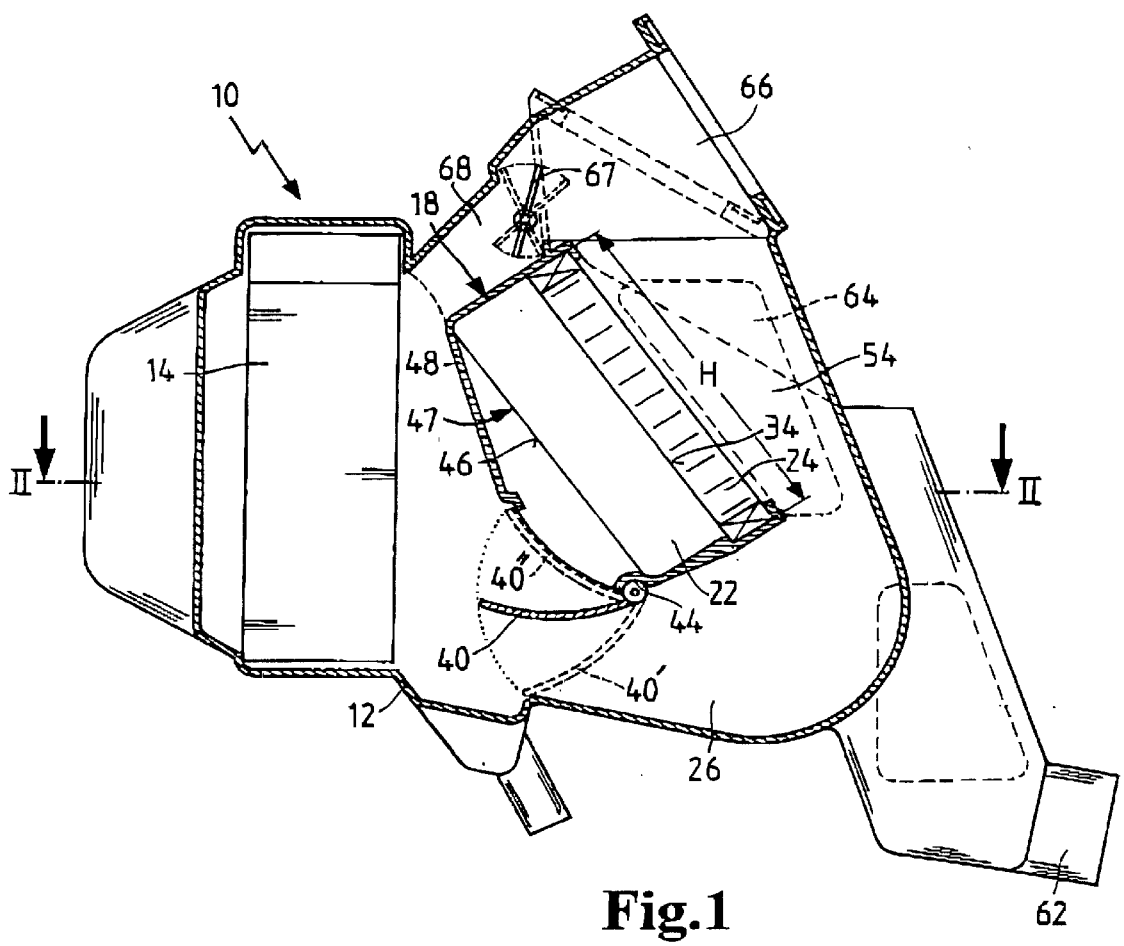
FIG. 1 shows a heating or air-conditioning system according to the invention in cross section, viewed from the side.

The present invention is directed to a heating or air-conditioning system. The air-conditioning system has a heater for warming air and guiding air into a mixing space and a cold air duct leading under the heater and into the mixing space through a sub-duct. A mixing flap is arranged at the junction between the heater and sub-duct and is movable to control the ratio of air provided to the heater and the sub-duct. The mixing space receives this air, which then mixes to a specified temperature.

The mixing space guides the mixed air through an air duct and an air outlet nozzle into an air-conditioned zone.

According to one aspect of the invention, the system includes several mixing spaces separated by walls for supplying independently controllable air-conditioned zones. The mixing spaces may extend the complete height of the heater. In one embodiment, the mixing flaps are rotatable such that in one position the flaps partially block the inlet to the heater and in another position the flaps substantially block air from entering the sub-duct.

The present invention may also include nonreturn flaps configured as a plurality of jalousie-type or louver-type vanes or flaps disposed between the heater and a mixing space such that, in its closed position, the nonreturn flap covers a portion of the outlet of the heater. The system may include a heater comprising a heat exchanger and an auxiliary heater.

In one embodiment, at least two of the mixing flaps can be coupled. In addition, a cold air bypass may be arranged above the heater.

According to a preferred embodiment of the present invention, the cold air duct of the heating or air-conditioning system is divided into four sub-ducts. The cold air duct extends under the heater. Four mixing spaces are arranged next to one another other, and each mixing space extends over the full height of the heater. Each mixing space has an air-flow control element in the form of a mixing flap. The system according to the present invention easily supplies air to the four air-conditioned zones (e.g., driver area, front seat passenger area, left rear area and right rear area). The system of the present invention air-conditions the air in each air-conditioned zone while requiring only one mixing flap for each zone. Because of its simple design, the heating or air-conditioning system of the present invention is appropriately cost-effective. In addition, because of the way this system regulates the air, a cost-effective heat exchanger having a single flow can be used as the heater.

By feeding the cold air adjacent to the heater, the system is relatively compact. Thus, this heating or air-conditioning system, despite its capacity to supply four air-conditioned zones, does not require more installation space than known air-conditioning systems which can supply only one or two air-conditioned zones. The present system better mixes the air in the mixing spaces before the air is fed into the outlet nozzles via the air ducts. This improvement is particularly noticeable with respect to the air which is diverted laterally to the side nozzles. Thus, the heating or air-conditioning system according to the present invention mixes the air better than those air-conditioning systems which regulate the air by feeding the cold air past the heater laterally.

According to one embodiment of the invention, the mixing flaps are designed as swivel flaps with swivel axes arranged on the lower edge of the heater. This feature is structurally simple and cost effective.

In order to prevent "residual heating" of cooled air which has been fed past the heater, each mixing space can be assigned a nonreturn flap. A non-return flap may have a plurality of vanes or flaps arranged in a blind-like fashion (such as is known, for example, from German Patent No. 41 19 474) such that in its closed position, the flap covers a part of the air outlet side of the heater assigned to the respective mixing space. In its preferred orientation, the vanes of the nonreturn flap open toward the cold air duct (or downward). The open vanes may also act as an air guide to direct the warm air downwardly toward the cold air.

For motor vehicles with low-consumption internal combustion engines which generate only little waste heat, the heater is preferably provided with, not only a heat exchanger through which coolant for the engine flows, but also an auxiliary heater, parallel to the heat exchanger, preferably including electrical heating elements, such as PCT heating elements. The system including the auxiliary heater can generally supply sufficiently warmed air to the interior of the vehicle, even when the engine is warming up or during extremely cold weather.

Placement of the auxiliary heater downstream of the heat exchanger also prevents the residual heating, which has already been mentioned. Therefore, by properly placing the auxiliary heater, the nonreturn flaps may be omitted, resulting in further optimization of costs and installation space.

Coupling at least two of the mixing flaps to one another modifies the present air-conditioning system for four air-conditioned zones into a heating or air-conditioning system for only two air-conditioned zones. The modification requires that the corresponding mixing flaps are simply coupled such that corresponding actuators for the coupled mixing flap are unnecessary. In this way, the heating or air-conditioning system of the present invention can be used in a very flexible way without substantial cost, additional construction or new tools, in vehicles with two and four air-conditioned zones.

In order to obtain a stratification of temperatures within an air-conditioned zone, a cold air bypass is provided above the heater, with the result that cold air can be fed directly to the central nozzles, for example.

The present heating or air-conditioning system 10 illustrated in FIG. 1 has a blower (not illustrated) and an evaporator 14 arranged in a housing 12, for generating cold air. A heater 18 for generating warm air is disposed downstream of the evaporator 14. The heater 18 comprises a heat exchanger 22 through which coolant for the power plant of the motor vehicle can flow. The heater 18 may optionally include an auxiliary heater 24 arranged parallel to heat exchanger 22 and preferably comprising electrical heating elements, such as PTC heating elements. The auxiliary heater 24 is arranged downstream on an air outlet side 34 of the heat exchanger 22.

Figure 2:
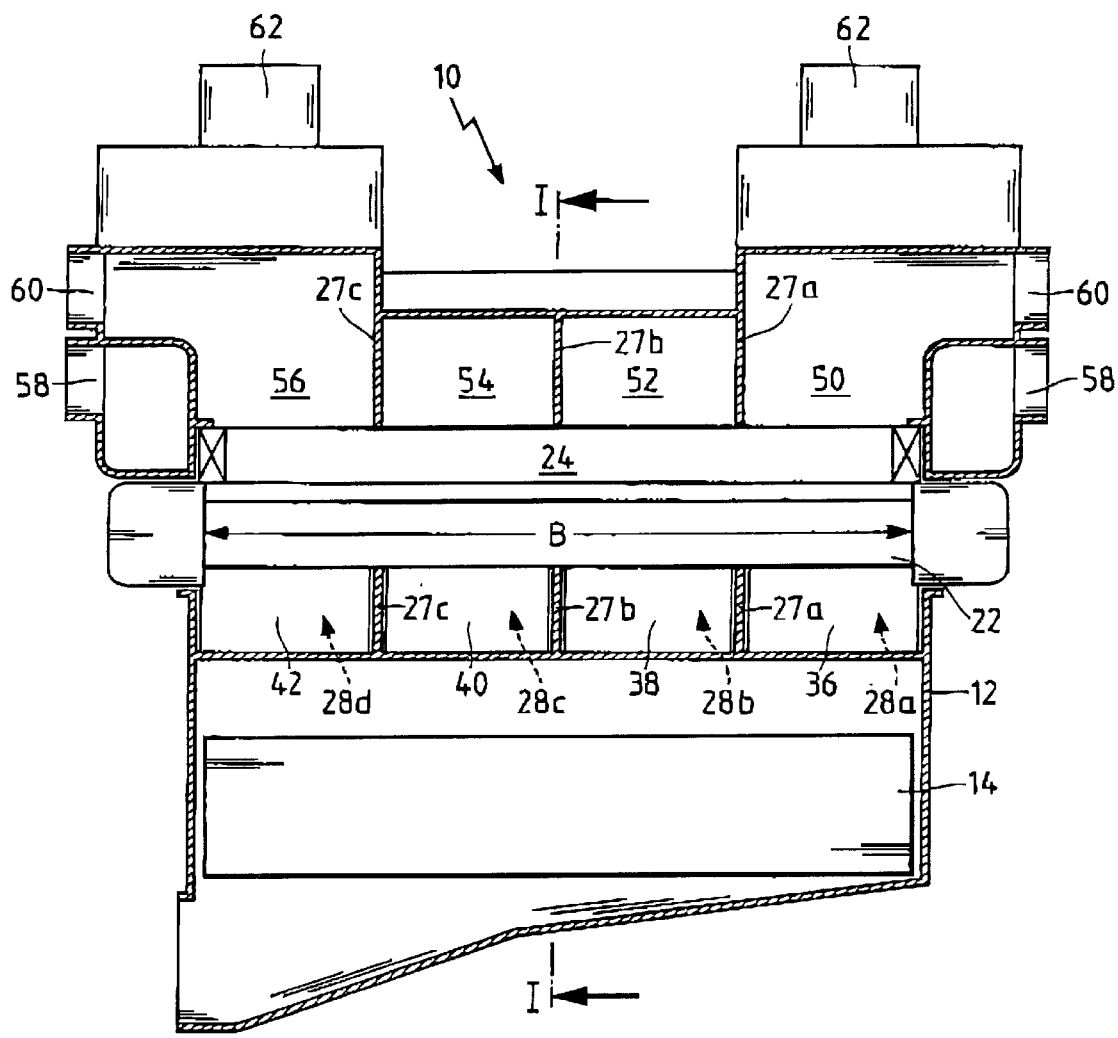
FIG. 2 shows a cross section along the line II—II in FIG. 1.

As can be seen in FIG. 1, in the installed heating or air-conditioning system 10 according to the present invention, a cold-air duct 26 extends over the full width B (FIG. 2) of the heater 18 and runs under the heater 18. Dividing walls 27a–27c divide the cold air duct 26 into four sub-ducts 28a–28d extending parallel to one another and oriented in the direction of air flow. The dividing walls 27a–27c extend from under the heater 18 to an area located adjacent to the heater 18 in the direction of air flow to form four air mixing spaces 50, 52, 54 and 56 on the air outlet side 34. The warm air heated in the heater 18 and the cold air which has been fed past the heater 18 in the cold air sub-ducts 28a–28d respectively enter the mixing spaces 50, 52, 54 and 56 and are mixed. As discussed previously, this mixing is useful to obtain air at a specific mixing temperature for each mixing space 50, 52, 54 and 56. The four mixing spaces 50, 52, 54 and 56 are arranged next to one another, as illustrated in FIG. 2, and each extends over the full height H of the heater 18 (FIG. 1).

In addition, according to the present invention, four airflow control elements 36, 38, 40 and 42 are arranged upstream of the heater 18. The airflow control elements 36–42 are preferably designed as swivel flaps whose swivel axes are disposed at the lower edge 44 of an air inlet side 46 of the heater 18. The airflow control elements 36–42 comprise mixing flaps 36–42, assigned to the mixing spaces 50–56, one per mixing space. Each of the mixing flaps 36–42 is movable. For example, as shown in FIG. 1, flap 40 can rotate throughout the range from 40' to 40" (both shown in phantom). When in position 40', the mixing flaps 40–42 close off their respective cold air sub-duct 28a–28c, such that exclusively warm air is fed into the corresponding mixing space 50–54. When in position 40", the mixing flap 40 closes off its respective area of the air inlet side 46 of the heater 18, such that exclusively cold air is fed into the corresponding mixing space 54. For reasons of flow technology and in order to be able to cover the heater 18 over its full height H, cover 48 continuously covers an upper part 47 of the heater 18. Mixing flap 40 can be positioned anywhere between the positions 40' and 40" to obtain the desired mixing temperatures in its respective mixing space 54. Of course, the mixing flaps 36–42 can be regulated separately so that the air temperature of each mixing space can be set separately. Corresponding control devices for the air-conditioning system 10 are preferably provided in the front area for the two front air-conditioned zones and in the rear area for rear air-conditioned zones.

Air ducts 58, 60, 62 64 and 66 branch off from the mixing spaces 50 to 56 and direct the air-conditioned mixed air to respective outlet openings which are located in the corresponding air-conditioned zones.

Figure 3:
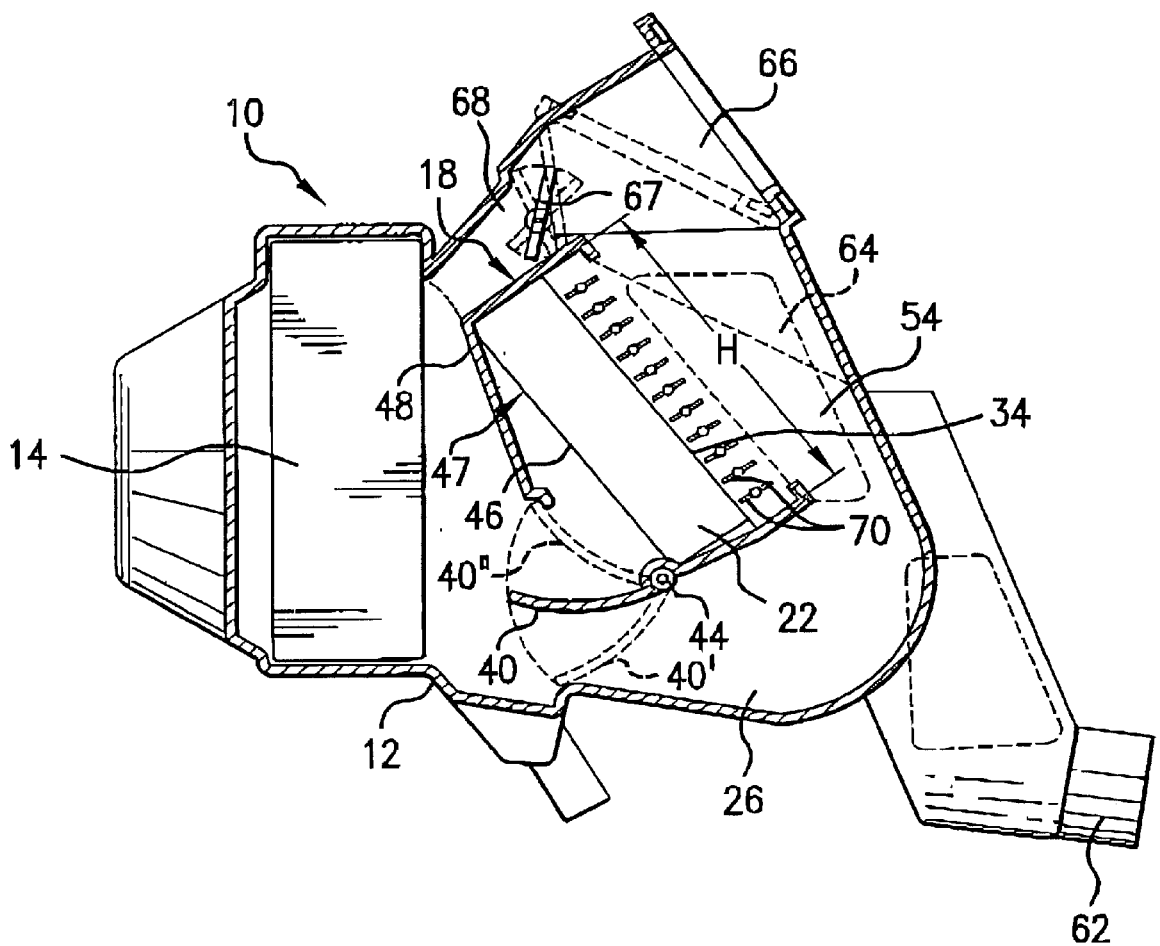
FIG. 3 is a view similar to FIG. 1, showing an alternative embodiment.

Without the auxiliary heater 24, nonreturn flaps as shown in FIG. 3 may be provided on the air outlet side 34 of the heater 18 in each mixing space 50–56. The nonreturn flaps preferably have a plurality of louvers 70 arranged in a blind-like fashion. In their closed position, the flaps cover a part of the air outlet side 34 of the heater 18 assigned to each respective mixing space.

Cold air can be fed via the air ducts 66 above the heater and directly to a central nozzle and/or side nozzles, for example, via a bypass 68 (FIG. 1). This pathway can be closed off with a bypass flap 67.

Preferably, a control device for each of the front area and the rear area is provided controlling the respective air-conditioned zones of the heating or air-conditioning system according to the present invention. A user sets a temperature set point value for the temperature sensor for each of the front and rear areas. The sensor then automatically regulates the temperature for its zone based on the set point value. This system also performs an air-quantity regulation function for each zone. That is, a control program for actuating the mixing flaps can, for example, throttle the flaps leading to the remaining zones to increase the air flowing out into a specific zone.

In a further exemplary embodiment (not illustrated), at least two mixing flaps can be coupled (e.g., the flaps 36 and 38 that control the air mixture for the front and the rear areas). The coupled mixing flaps are then driven by a common actuator, such that only a left/right regulation with the heating or air-conditioning system according to the present invention is possible.

Although the present invention has been described with reference to certain preferred embodiments, those skilled in the art will recognize that changes may be made in form and detail without departing from the spirit and scope of the invention.

The entire subject matter of German Patent Application No. 197 39 578.3, filed Sep. 10, 1997, is hereby incorporated by reference.

What is claimed is:

1. A compact heating or air-conditioning system providing separately conditioned air to four individual zones in a motor vehicle passenger compartment, comprising:

a housing;

a generally planar heater located in said housing, said heater having a heated air exit surface and having a bottom and a top end defining a height of the heater;

an interior partition in said housing defining an air inlet opening for the heater;

first, second, third, and fourth parallel cool-air sub-ducts extending below the heater;

first, second, third, and fourth axially elongated air mixing spaces communicating respectively with and positioned downstream of the first, second, third, and fourth sub-ducts, the first, second, third, and fourth mixing spaces having an air inlet at the bottom end of the heater and having an air exit at the top end of the heater and being defined by the heated air exit surface of the heater and a portion of said housing extending in opposed relationship to the heated air exit of the heater, whereby the first, second, third, and fourth mixing spaces extend parallel to the exit surface of the heater over substantially the full height of the heater, the first, second, third, and fourth mixing spaces receive air heated by the heater immediately downstream of the heater and receive cool air from the first, second, third, and fourth sub-ducts at the bottom of the heater, thereby defining an air-flow path substantially parallel to the exit surface of the heater, receiving air at said air inlet at the bottom end of the heater and discharging mixed heated air at said air exit at the top end of the heater; and first, second, third, and fourth air control elements for determining respective quantities of the heated air and cool air to be mixed, the first, second, third, and fourth air control elements being disposed upstream of the heater, wherein each of the first, second, third, and fourth air control elements is movable between a first position in which the air control element substantially blocks cool air from entering the respective sub-duct and a second position in which the respective air control element blocks a portion of the heater inlet and fully opens the respective sub-duct, wherein the first, second, third and fourth air control elements are located near the bottom end of the heater and the upper portion of the upstream side of the heater is continuously covered by a cover member, and wherein each of the first, second, third, and fourth air mixing spaces is adapted to communicate with at least one mixed air duct and at least one air outlet nozzle for guiding mixed air to a respective conditioned zone to provide four separate conditioned zones in the vehicle.

2. A heating or air-conditioning system according to claim 1, wherein the heater is oriented generally vertically within the housing.

3. A heating or air-conditioning system according to claim 1, wherein the heater air exit surface faces toward said housing portion and is spaced a first distance away from said housing portion which extends generally in alignment with the heater air exit surface, said first distance defining a depth of said mixing spaces, said mixing space depth being selected to provide cool air flow in each mixing space in a direction substantially parallel to the air exit surface of the heater, as cool air flows from the mixing space inlet to the mixing space outlet, whereby there results a compact system in which the mixing spaces add little to the horizontal depth of the system.

4. A heating or air-conditioning system according to claim 3, further comprising a generally planar air-conditioning evaporator oriented essentially vertically in the housing and positioned a second distance upstream of the heater, wherein said second distance is relatively small, such that a portion of the heater is positioned substantially adjacent to the evaporator, whereby there results a compact heating/air-conditioning system having a horizontal depth comprised essentially of the sum of the depths of the evaporator, the heater and the mixing spaces.

5. A heating or air-conditioning system according to claim 1, wherein the first, second, third, and fourth mixing spaces are separated by respective dividing walls.

6. A heating or air-conditioning system according to claim 1, wherein each of the first, second, third, and fourth air control elements comprises a mixing flap.

7. A heating or air-conditioning system according to claim 6, wherein each of the first, second, third, and fourth mixing flap is a swivel flap including a swivel axis arranged on a lower edge of the heater.

8. A heating or air-conditioning system according to claim 1, wherein the heater comprises a heat exchanger through which coolant for a power plant of the motor vehicle flows, and further includes an auxiliary heater arranged downstream of the heat exchanger, the auxiliary heater including auxiliary heating elements.

9. A heating or air-conditioning system according to claim 6, wherein at least two of the first, second, third, and fourth mixing flaps are coupled.

10. A heating or air-conditioning system of claim 1, further comprising a cold air bypass disposed above the heater.

11. A heating or air-conditioning system according to claim 1, wherein at least one mixing space further includes a nonreturn flap, the nonreturn flap including a plurality of louvered vanes disposed between the heater and the at least one mixing space, and wherein the nonreturn flap, in a closed position, covers a portion of an air exit surface of the heater.

12. A heater or air-conditioning system according to claim 11, wherein the vanes of the nonreturn flap open in a downward orientation toward the cool-air sub-duct and the vanes, in their open position, guide warm air exiting from the heater toward cool air entering the at least one mixing space.

13. A heater or air-conditioning system according to claim 12, wherein each of said four mixing spaces includes one of said nonreturn flaps.

14. A heater or air-conditioning system according to claim 3, wherein the heater and said housing portion are inclined from vertical.

15. A compact heating or air-conditioning system providing separately conditioned air to four individual zones in a motor vehicle passenger compartment, comprising:

a housing;

a generally planar heater located in said housing, said heater having a heated air exit surface and having a bottom and a top end defining a height of the heater, and said heater being oriented generally vertically within the housing;

an interior partition in said housing defining an air inlet opening for the heater;

first, second, third, and fourth parallel cool-air sub-ducts extending below the heater;

first, second, third, and fourth axially elongated air mixing spaces communicating respectively with and positioned downstream of the first, second, third, and fourth sub-ducts, the first, second, third, and fourth mixing spaces having an air inlet at the bottom end of the heater and having an air exit at the top end of the heater and being defined by the heated air exit of the heater and a portion of said housing extending in opposed relationship to the heated air exit surface of the heater, whereby the first, second, third, and fourth mixing spaces extend parallel to the exit surface of the heater over substantially the full height of the heater, the first, second, third, and fourth mixing spaces receive air heated by the heater immediately downstream of the heater and receive cool air from the first, second, third, and fourth sub-ducts at the bottom of the heater, thereby defining an air-flow path substantially parallel to the exit surface of the heater, receiving air at said air inlet at the bottom end of the heater and discharging mixed heated air at said air exit at the top end of the heater;

wherein at least one mixing space further includes a nonreturn flap, the nonreturn flap including a plurality of louvered vanes disposed between the heater and the at least one mixing space, and wherein the nonreturn flap, in a closed position, covers a portion of an air exit surface of the heater; and first, second, third, and fourth air control elements for determining respective quantities of the heated air and cool air to be mixed, the first, second, third, and fourth air control elements being disposed upstream of the heater, wherein each of the first, second, third, and fourth air control elements is movable between a first position in which the air control element substantially blocks cool air from entering the respective sub-duct and a second position in which the respective air control element blocks a portion of the heater inlet and fully opens the respective sub-duct, wherein the first, second, third and fourth air control elements are located near the bottom end of the heater and the upper portion of the upstream side of the heater is continuously covered by a cover member, wherein each of the first, second, third, and fourth air mixing spaces is adapted to communicate with at least one mixed air duct and at least one air outlet nozzle for guiding mixed air to a respective conditioned zone to provide four separate conditioned zones in the vehicle.

16. A heating or air-conditioning system according to claim 15, wherein the heater air exit surface faces toward said housing portion and is spaced a first distance away from said housing portion which extends generally in alignment with the heater air exit surface, said first distance defining a depth of said mixing spaces, said mixing space depth being selected to provide cool air flow in each mixing space in a direction substantially parallel to the air exit surface of the heater, as cool air flows from the mixing space inlet to the mixing space outlet, whereby there results a compact system in which the mixing spaces add little to the horizontal depth of the system.

17. A heating or air-conditioning system according to claim 16, further comprising a generally planar air-conditioning evaporator oriented essentially vertically in the housing and positioned a second distance upstream of the heater, wherein said second distance is relatively small, such that a portion of the heater is positioned substantially adjacent to the evaporator, whereby there results a compact heating/air-conditioning system having a horizontal depth comprised essentially of the sum of the depths of the evaporator, the heater and the mixing spaces.

* * * * *